United States Patent
Das et al.

(10) Patent No.: US 10,021,123 B2
(45) Date of Patent: Jul. 10, 2018

(54) CUSTOMIZED NETWORK TRAFFIC MODELS TO DETECT APPLICATION ANOMALIES

(71) Applicant: QUALCOMM Incorporated, San Diego, CA (US)

(72) Inventors: Saumitra Mohan Das, Santa Clara, CA (US); Mona Mahmoudi, Sunnyvale, CA (US); Vinay Sridhara, Santa Clara, CA (US); Rajarshi Gupta, Sunnyvale, CA (US); Yin Chen, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 14/753,666

(22) Filed: Jun. 29, 2015

(65) Prior Publication Data

US 2016/0381057 A1    Dec. 29, 2016

(51) Int. Cl.
| | |
|---|---|
| *H04L 29/06* | (2006.01) |
| *H04L 12/26* | (2006.01) |
| *G06F 21/55* | (2013.01) |
| *H04L 12/24* | (2006.01) |

(52) U.S. Cl.
CPC ........ *H04L 63/1425* (2013.01); *G06F 21/552* (2013.01); *H04L 41/0631* (2013.01); *H04L 43/0817* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 6,401,210 B1* | 6/2002 | Templeton | G06F 21/56 713/188 |
| 7,529,754 B2 | 5/2009 | Kester et al. | |
| 8,544,060 B1* | 9/2013 | Khetawat | H04L 63/20 713/165 |
| 8,806,644 B1 | 8/2014 | McCorkendale et al. | |
| 8,844,039 B2 | 9/2014 | Niemela et al. | |
| 9,838,405 B1* | 12/2017 | Guo | H04L 63/1416 |
| 2003/0229810 A1* | 12/2003 | Bango | G06F 21/56 726/24 |

(Continued)

FOREIGN PATENT DOCUMENTS

WO    2004012063 A2    2/2004

OTHER PUBLICATIONS

International Search Report and Written Opinion—PCT/US2016/034060—ISA/EPO—dated Jul. 19, 2016.

*Primary Examiner* — Peter Poltorak
(74) *Attorney, Agent, or Firm* — The Marbury Law Group, PLLC

(57) ABSTRACT

Systems, methods, and devices of the various aspects enable identification of anomalous application behavior. A computing device processor may detect network communication activity of an application on the computing device. The processor may identify one or more device states of the computing device, and one or more categories of the application. The processor may determine whether the application is behaving anomalously based on a correlation of the detected network communication activity of the application, the identified one or more device states of the computing device, and the identified one or more categories of the application.

24 Claims, 7 Drawing Sheets

(56) References Cited

U.S. PATENT DOCUMENTS

| | | | |
|---|---|---|---|
| 2005/0021792 A1* | 1/2005 | Nishida | G06F 21/52 709/229 |
| 2007/0289019 A1* | 12/2007 | Lowrey | G06F 21/554 726/24 |
| 2008/0047009 A1 | 2/2008 | Overcash et al. | |
| 2008/0163372 A1* | 7/2008 | Wang | G06F 21/56 726/24 |
| 2009/0326690 A1* | 12/2009 | Turchetta | G10L 19/018 700/94 |
| 2012/0002839 A1* | 1/2012 | Niemela | G06K 9/00973 382/100 |
| 2012/0210431 A1* | 8/2012 | Stahlberg | G06F 21/51 726/24 |
| 2013/0097706 A1 | 4/2013 | Titonis et al. | |
| 2013/0183951 A1 | 7/2013 | Chien | |
| 2013/0247187 A1* | 9/2013 | Hsiao | G06F 21/552 726/22 |
| 2014/0289528 A1* | 9/2014 | Baghdasaryan | G06Q 20/42 713/171 |
| 2015/0161024 A1 | 6/2015 | Gupta et al. | |
| 2015/0195181 A1* | 7/2015 | Birmiwal | H04L 43/50 709/224 |
| 2016/0330233 A1* | 11/2016 | Hart | H04L 63/102 |

\* cited by examiner

CUSTOMIZED NETWORK TRAFFIC MODELS TO DETECT APPLICATION ANOMALIES

BACKGROUND

Portable electronics, computing devices, and communication devices now offer a wide array of features and services that provide their users with unprecedented levels of access to information, resources, and communications. To provide such services, a computing device may execute one or more applications on the device, and further, the computing device may communicate with one or more communication networks, typically to send and/or receive information for the one or more applications. Computing devices that provide advanced information services are increasingly ubiquitous, and are increasingly relied on to perform important tasks that may touch on the security of personal information (e.g., credit card information, contacts, etc.). Such computing devices are also increasingly integrated into physical systems such as for monitoring the condition of patients, the safety of children, and the physical control of machinery (e.g., vehicles, manufacturing machinery, etc.) to name a few examples. Maintaining the integrity of such computing devices against malfunctions and malicious attacks is increasingly important.

SUMMARY

Systems, methods, and devices of various aspects enable a processor of the computing device to identify anomalous application behavior. Various aspects may include detecting network communication activity of an application on a computing device, identifying one or more device states of the computing device, identifying one or more categories of the application, and determining whether the application is behaving anomalously based on a correlation of the detected network communication activity of the application, the identified one or more device states of the computing device, and the identified one or more categories of the application.

In some aspects, the network communication activity may include one or more of a network traffic pattern of the network communication activity, a quantity of information sent by the application, a quantity of information received by the application, a quantity of destinations to which information is sent by the application, a quantity of sources from which information is received by the application, a type of information sent or received by the application, a data protocol used by the application, and a port traffic mapping related to the network communication activity of the application.

In some aspects, the device states may include one or more of a coarse motion classifier, a device position, and a device network communication state. In some aspects, determining whether the application is behaving anomalously based on a correlation of the detected network communication activity of the application, the identified one or more device states of the computing device, and the identified one or more categories of the application may include generating a behavior vector based on the detected network communication activity of the application, the identified one or more device states of the computing device, and the identified one or more categories of the application, applying one or more classifier models appropriate for the one or more categories of the application to the generated behavior vector, and determining whether the application is behaving anomalously based on a result of applying one or more classifier models appropriate for the one or more categories of the application to the generated behavior vector.

Some aspects may further include taking an action to limit the application behavior in response to determining that the application is behaving anomalous. In some aspects, identifying one or more categories of the application may include analyzing one or more screenshots of a display generated by the application on the computing device. In some aspects, analyzing one or more screenshots of a display generated by the application on the computing device may include determining whether the application is an image-based application, a text-based application, or a meta-application based on a plurality of screenshots of the display generated by the application on the computing device.

In some aspects, analyzing one or more screenshots of a display generated by the application on the computing device may include determining whether the application is a still-image application or a video application in response to determining that the application is an image-based application. In some aspects, identifying one or more categories of the application may include analyzing audio signals generated by the application, and correlating the analyzed audio signals with the one or more screenshots of the display generated by the application on the computing device. In some aspects, identifying one or more categories of the application may include analyzing inputs received at a user interface of the computing device related to the application, and correlating the analyzed inputs at the user interface with the one or more screenshots of the display generated by the application on the computing device.

Systems, methods, and devices of some aspects enable a processor of the computing device to determine a category of an application on a computing device. Such aspects may include generating a feature vector characterizing one or more screenshots of a display generated by the application on the computing device, and applying a classifier model to the feature vector, in which one or more categories of the application are identified based on the results of applying the classifier model to the feature vector. In some aspects, applying a classifier model to the feature vector may include determining whether the application is an image-based application, a text-based application, or a meta-application based on the generated feature vector.

In some aspects, applying a classifier model to the feature vector may include determining whether the application is a still-image application or a video application in response to determining that the application is an image-based application.

In some aspects, generating a feature vector may include analyzing audio signals generated by the application, and correlating the analyzed audio signals with the one or more screenshots of the display generated by the application on the computing device. In some aspects, generating a feature vector may include analyzing inputs received at a user interface of the computing device related to the application, and correlating the analyzed inputs at the user interface with the one or more screenshots of the display generated by the application on the computing device.

Various aspects may include a computing device including a processor configured with processor-executable instructions to perform operations of the methods described above. Various aspects may include a computing device including means for performing functions of the methods described above. Various aspects may include non-transitory processor executable instructions configured to cause a computing device processor to perform operations of the methods described above.

BRIEF DESCRIPTION OF THE DRAWINGS

The accompanying drawings, which are incorporated herein and constitute part of this specification, illustrate exemplary aspects, and together with the general description given above and the detailed description given below, serve to explain the features of the various aspects.

DETAILED DESCRIPTION

Figure 1:
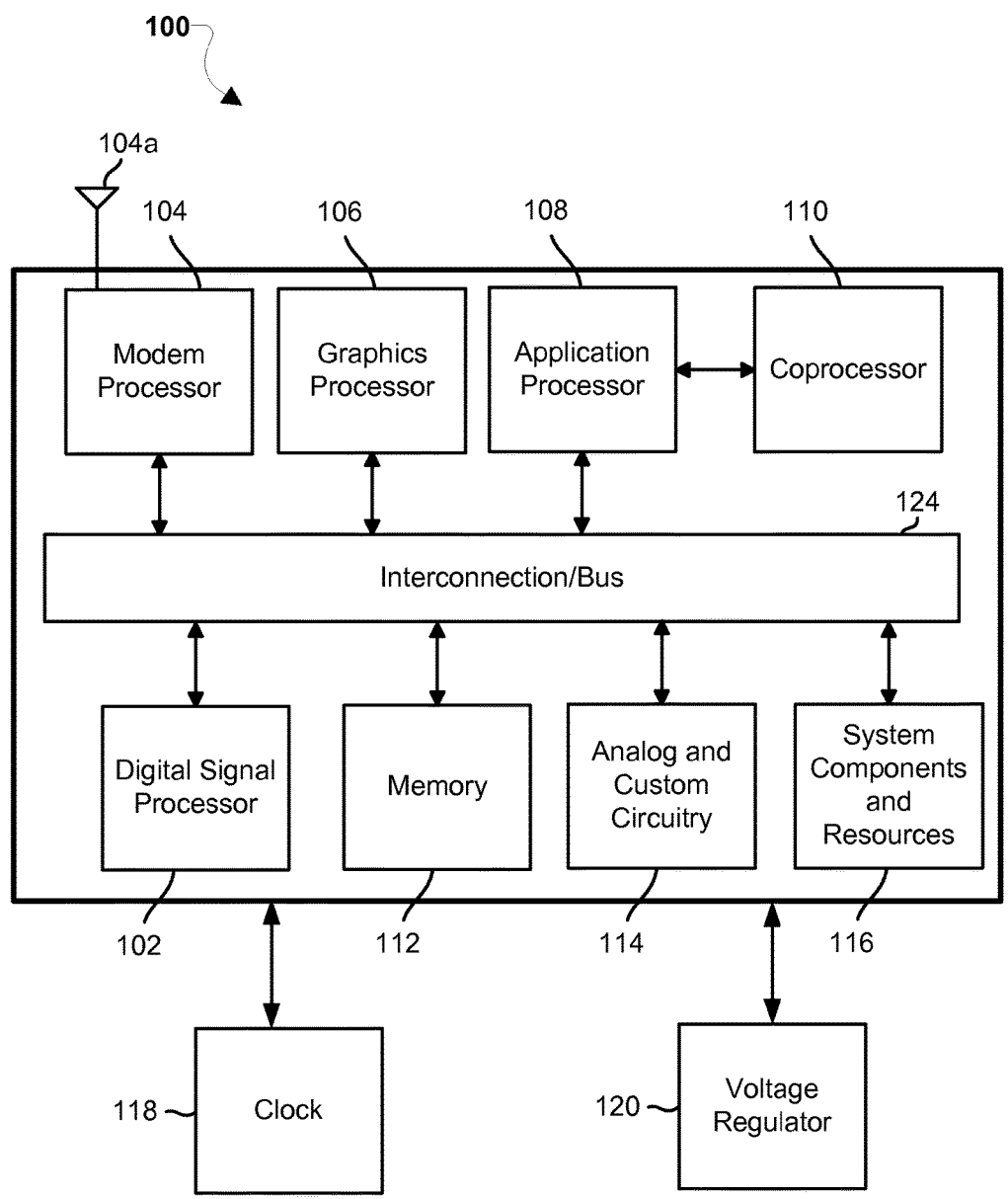
FIG. 1 is an architectural diagram illustrating an example system-on-chip that may be used to implement the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the various aspects or the claims.

The various aspects include methods, and computing devices and systems configured to implement the methods, of monitoring and analyzing the behavior of an application running on a computing device by detecting, by a processor of the computing device, network communication activity of the application, and determining whether the application is behaving anomalously based on whether the detected network communication activity of the application is consistent with a category of the application.

The terms "computing device," "mobile device," and "communication device" are used interchangeably herein to refer to any one or all of cellular telephones, smartphones, personal or mobile multi-media players, personal data assistants (PDAs), laptop computers, tablet computers, smartbooks, ultrabooks, palmtop computers, wireless electronic mail receivers, multimedia Internet enabled cellular telephones, wireless gaming controllers, and similar personal electronic devices which include a memory and a programmable processor.

The terms "component," "module," "system" and the like are used herein to refer to a computer-related entity, such as, but not limited to, hardware, firmware, a combination of hardware and software, software, or software in execution, which are configured to perform particular operations or functions. A module For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Computing devices have evolved into complex electronic systems capable of providing advanced information services, and now commonly include several powerful processors, large memories, and other resources that enable the executing of complex software applications and communicating across communication networks. The various aspects enable maintaining the integrity of computing devices against malfunctions and malicious attacks by monitoring and analyzing the behavior of an application running on a computing device and determining whether the application is behaving anomalously.

In some aspects, the computing device may utilize a behavioral analysis system. The behavioral analysis system may detect anomalous behavior of the application or processes running on a device. In some aspects, the processor of the computing device may monitor network activity of an application on a device, and may correlate the application's network activity with a state of the device to identify a behavioral anomaly, particularly a network interaction behavior, of the application. In some aspects, the processor may use a behavior classifier model that may be customized or specifically generated for a determined application category to analyze the application's behavior, which may be represented one or more behavior vectors. For example, some applications should be expected to use minimal cellular data, and should perform most networking operations using a Wi-Fi communication link, but may perform certain time-critical applications using a cellular network connection. As another example, application may be expected to use a large amount of network communication, but the expected network communication may be of a certain data type, data size, in a particular data communication format or communication protocol, or may be expected to be with a certain communication source or destination, or limited to a certain range of communication sources or destinations. As another example, an application may be expected to use a communication network minimally, if at all. The processor may automatically categorize an application based on the application's behavior. In some aspects, an application may be associated with more than one category.

In some aspects, the processor may also correlate an application's behavior with a device state. For example, a gaming application may be expected to access a communication network while the device is stationary, but may not be expected to engage into network communication activity while the device is in motion, such as when the user is walking or running (e.g., as may be determined by accelerometers, GPS data, access point or base station triangulation, or by another method). As another example, a photo application may not be expected to take photographs and to access a communication network while the computing device is in a holster or bag. Thus, network activity by a device application correlated with a device state may be an indication of anomalous activity by the application.

In some aspects, the processor may identify one or more device states of the computing device based on a coarse motion classifier, a device position tracking classifier, and/or a network communication state. The processor may determine the coarse motion classifier based on a detected motion state of the device, such as standing, walking, running, biking, and other motion states. The processor may determine the coarse motion classifier using, for example GPS data received by the computing device, accelerometer data, and other motion data that may be computed or received by the computing device.

The processor may determine the device position tracking classifier based on whether the device is in use (i.e., is experiencing motion, detecting ambient light levels, detecting RF signal strength levels, and other information inputs) consistent with being in a user's hand, or being worn on the user's body) or not in use (i.e., is in a device holster, in a bag, on a tabletop, or another position consistent with not being in use). The processor may determine the network communication state based on whether the communication device is connected to a communication network (e.g., a Wi-Fi network, a cellular network, or both, or neither). The processor may also determine the network communications state based on a volume of data traffic sent or received by the computing device in communication with one or more communication networks.

In some aspects, the processor of the computing device may develop advanced traffic models for analyzing application behavior and device states. For example, a computing device may collect state related data and network traffic data of an application, and send the state data and network traffic data to a server over a communication network for amalgamation and analysis. The server may develop a customized model for the application category (or categories) using the state data and the network traffic data from many devices to train more highly customized models to detect anomalous network activity in applications of that category (or categories). In some aspects, the processor may reduce the number of features tested on the device based on a device limitation, such as a low battery level, a limited network connection speed, a slow processor, low available memory, or another device limitation.

Application-specific traffic models may be useful for detecting anomalies in application behavior. For example, the text messaging application may be expected to access a list of contacts on the computing device, or send or receive pictures or video, or send text messages, whereas a gaming application may not be expected to perform any of these activities. As another example, certain applications may be expected to send information, such as an identifier or other device specific information, for registration purposes, whereas for other applications such behavior may be clearly malicious. As another example, an application for note taking may be expected to have little, if any, network traffic, as compared to a communication application (e.g. a voice or messaging application). A gaming application, as another example, may not be expected to use network communication while the computing device is in motion consistent with walking or biking, but may be expected to use network communication while stationary and while the computing device is executing the gaming application (i.e., a user is playing a game).

In some aspects, the processor may use the behavioral analysis system to categorize the application running on the computing device. The processor may identify the application running on the computing device by analyzing one or more screenshots taken periodically of a display generated on the computing device by the application. The processor may use a variety of image analysis techniques to analyze the one or more screenshots, and may also analyze changes in a sequence of screenshots. The processor may determine an application category east on the analyzed screenshots and or analyzed sequence of screenshots.

In some aspects, the processor may determine whether the one or more screenshots are predominantly text or predominantly images. For example, the processor may use a "corner counting" technique by analyzing detectable sharp corners in the one or more screenshots, which may be more prevalent in text than in an image. The processor may also plot a histogram of gray values or gradient norms, which may be more diverse for images, and more binary (e.g., more strictly black-and-white) for text.

In some aspects, the processor may further distinguish images between video and still images. For example, the processor may use gradient distributions to distinguish lower contrasting videos as compared to still images. The processor may also compute a percentage of overlap or changes among a sequence of screenshots, which may be relatively high in a sequence of screenshots from a video, and which may be relatively low in a sequence of screenshots that are very different, as may be expected from a photo gallery application or similar application. The processor may also compute an XOR function to identify higher overlap (i.e., lower XOR) in a sequence of screenshots from a video, as opposed to a sequence of screenshots from different images. The processor may also determine a number of matching descriptors of each of the one or more screenshots, which may be higher in a sequence of screenshots from a video, as opposed to a sequence of screenshots from different images.

In some aspects, the processor may also analyze audio signals generated by the application and/or inputs received at a user interface of the computing device generated by the application. The processor may correlate the analyzed audio signals and or analyzed inputs to more accurately determine the category or categories of the application.

The various aspects may be implemented in a number of different computing devices, including single processor and multiprocessor systems, and a system-on-chip (SOC). FIG. 1 is an architectural diagram illustrating an example SOC 100 architecture that may be used in computing devices and systems implementing the various aspects. The SOC 100 may include a number of heterogeneous processors, such as a digital signal processor (DSP) 102, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8). The modem processor 104 may communicate with an antenna 104a to enable the sending and receiving of radio communications, e.g., with another device or with a communication network.

The SOC 100 may also include analog circuitry and custom circuitry 114 for managing sensor data, analog-todigital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device. The system components 116 and custom circuitry 114 may include circuitry to interface with peripheral devices, such as cameras, electronic displays, wireless communication devices, external memory chips, etc. The processors 102, 104, 106, and 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 102, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth, WLAN, Wi-Fi, etc.), and other well-known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
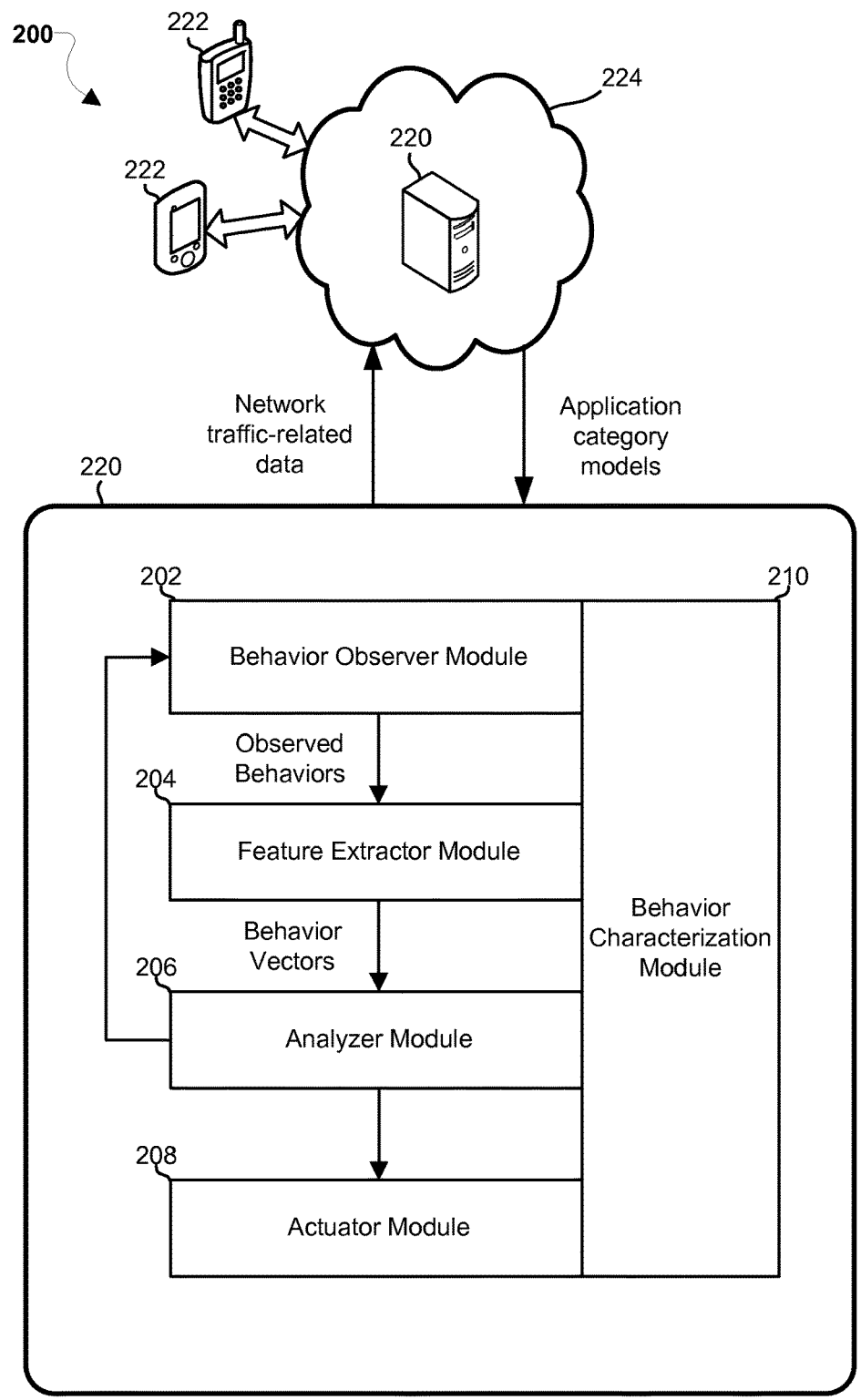
FIG. 2 is a block diagram illustrating example logical components and information flows in an application behavior characterization system suitable for use with the various aspects.

FIG. 2 illustrates example logical components and information flows in an aspect computing device 200 that includes an application behavior characterization system 220 configured to use behavioral analysis techniques to characterize behavior of an application in accordance with the various aspects. In the example illustrated in FIG. 2, the computing device includes a device processor (e.g., the processor 102, 104, 106, 108 of FIG. 1) configured with executable instruction modules that include a behavior observer module 202, a feature extractor module 204, an analyzer module 206, an actuator module 208, and a behavior characterization module 210.

The behavior observer module may be configured to observe behaviors of an application (e.g., network communication activity, messaging, instructions, memory accesses, requests, data transformations, and other application behavior), and may also observe that obtain other information, such as one or more device states. The behavior observer module may collect behavior information pertaining to the application, as well as the additional information about the computing device, and may store the collected information in a memory (e.g., in a log file, etc.). The feature extractor module may use the collected behavior information pertaining to the application and the additional information about the computing device to generate a representation of such information in the form of one or more behavior vectors. The analyzer module may compare the generated behavior vectors to one or more classifier models that are appropriate the type or category of application to evaluate the behavior of the application, to characterize the application behaviors, and to determine whether the observed behaviors indicate that the application is behaving anomalously. In some aspects, the analyzer module may also determine a category of an application. The actuator module may initiate or recommend an action to modify an application behavior response to a determination that the application is behaving anomalously.

Each behavior vector may be a data structure or an information structure that includes or encapsulates one or more features. A behavior vector may include an abstract number or symbol that represents all or a portion of observed application behavior (i.e., a feature). Each feature may be associated with a data type that identifies a range of possible values, operations that may be performed on those values, the meanings of the values, and other similar information. The data type may be used by the behavior characterization system to determine how the corresponding feature (or feature value) should be measured, analyzed, weighted, or used.

In an aspect, the behavior characterization system may be configured to generate a behavior vector of size "n" that maps the observer real-time data into an n-dimensional space. Each number or symbol in the behavior vector (i.e., each of the "n" values stored by the vector) may represent the value of a feature. The behavior characterization system may analyze the behavior vector (e.g., by applying the behavior vector to a model of various categories of applications to evaluate the behavior of the observed application. In some aspects, the behavior characterization system may also combine or aggregate the behavior scores of all application behavior and/or device states, for example, into an average behavior score, a weighted average behavior score, or another aggregation. In some aspects, one or more weights may be selected based on a feature of observed behavior.

In an aspect, the behavior characterization system may be configured to store models of various categories of applications. A model of an application category may identify one or more features of observable behavior of an application category that may indicate the application is behaving anomalously. In some aspects, models of application category behavior may be stored in a cloud server or network, shared among a large number of devices, sent to each communication device periodically or on demand, and customized in the behavior characterization system based on observed behaviors of the application. One or more models of application behavior may be, or may be included, in a classifier model. In some aspects, the behavioral analysis system may adjust the size of a behavior vector to change the granularity of features extracted from the application behavior.

A classifier model may be a behavior model that includes data, entries, decision nodes, decision criteria, and/or information structures that may be used by a device processor to quickly and efficiently test or evaluate features (e.g., specific factors, data points, entries, APIs, states, conditions, behaviors, software applications, processes, operations, and/or components, etc.) of the observed application behavior. A classifier model may include a larger or smaller data set, the size of which may affect an amount of processing required to apply a behavior vector to the classifier model. For example, a "full" classifier model may be a large and robust data model that may be generated as a function of a large training dataset, and which may include, for example, thousands of features and billions of entries. As another example, a "lean" classifier model may be a more focused data model that is generated from a reduced dataset that includes or prioritizes tests on the features/entries that are most relevant for determining and characterizing the behavior of a particular application, or category of application. In some aspects, the behavioral analysis system may change the robustness and/or size of a classifier model used to analyze a behavior vector.

A local classifier model may be a lean classifier model that is generated in a behavior characterization system. By generating classifier models in the behavior characterization system in which the models are used, the various aspects allow each computing device to accurately identify the specific features that are most important in determining and characterizing a particular observed application's behavior based on the particular application behaviors that are observable by the behavior characterization system. These aspects may also allow each computing device to accurately prioritize the features in the classifier models in accordance with their relative importance to classifying behaviors of the application.

Based on the comparison of the generated behavior vectors to the one or more classifier models, the behavioral analysis system of each communication device may initiate an action. In some aspects, the action may modify the behavior of the application in response to determining that the application is behaving anomalously. In some aspects, the action may serve to limit or stop any network communication activity of the application.

In various aspects, all or portions of the behavior characterization module 210 may be implemented as part of the behavior observer module 202, the feature extractor module 204, the analyzer module 206, or the actuator module 208. Each of the modules 202-210 may be a thread, process, daemon, module, sub-system, or component that is implemented in software, hardware, or a combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the module 200.

The behavior characterization module 210 may be configured to characterize the behavior of an application, generate at least one behavior vector based on the observed application's behavior, compare the application's behavior vector with at least one classifier model, and to determine based on the comparison of the at least one behavior vector to the at least one classifier model whether the application is behaving anomalously. The behavior characterization module 210 may use the information collected by the behavior observer module 202 to determine behaviors of the application, and to use any or all such information to characterize the behavior of the application.

The behavior observer module 202 may monitor the activities of the application by monitoring data network activity, which may include types of connections, protocols, port numbers, destinations and/or sources of information with which the application communicates, the number of connections established, volume or frequency of communications, data communication protocols used, port traffic mappings, etc. The behavior observer module 202 may also correlate such observed communication information with the size of the application (e.g., the size of an APK file). The behavior observer module 202 may also be configured to observe behaviors of the application based on messages, instructions, memory accesses, requests, data transformations, activities, conditions, operations, events, and other application behavior. The behavior observer module 202 may further monitor phone network activity, which may include monitoring the type and number of calls or messages (e.g., SMS, etc.) sent out, received, or intercepted. The behavior observer module 202 may also monitor software or other code that is downloaded by an application, computing device information accessed by and/or used by the application applications (e.g., device identity information, user identity information, computing device and/or user account information, contact information, information about other applications on the computing device, call information, text or media messaging information, computing device location information, device hardware information (e.g., information about a device camera, accelerometer, GPS), browser information, content of browser-based communications, content of voice-based communications, short range radio communications (e.g., Bluetooth, WiFi, etc.), content of text-based communications, content of recorded audio files, and other information on a computing device that the application may access. The behavior observer module 202 may also monitor the activities of the application by monitoring the system resource usage, which may include monitoring a number of forks, memory access operations, number of files open, etc.

The behavior observer module 202 may also monitor one or more states of the computing device. Device state information may include one or more of a coarse motion classifier, a device position tracking classifier, and a network communication state. The behavior observer module 202 may determine the coarse motion classifier based on a detected motion state of the device, such as standing, walking, running, biking, and other motion states. The behavior observer module 202 may determine the coarse motion classifier using, for example, GPS data received by the computing device, accelerometer data, and other motion data that may be computed or received by the computing device. The behavior observer module 202 may determine the device position tracking classifier based on whether the device is in use (i.e., is experiencing motion, detecting ambient light levels, detecting RF signal strength levels, and other information inputs) consistent with being in a user's hand, or being worn on the user's body) or not in use (i.e., is in a device holster, in a bag, on a tabletop, or another position consistent with not being in use). The behavior observer module 202 may determine the network communication state based on whether the communication device is connected to a communication network (e.g., a Wi-Fi network, a cellular network, or both, or neither). The behavior observer module 202 may also determine the network communications state based on a volume of data traffic sent or received by the computing device in communication with one or more communication networks.

The number of observable behavioral elements of an application may be relatively large. To reduce the number of behavioral elements monitored to a manageable level, in an aspect, the behavior observer module 202 may be configured to perform coarse observations by monitoring or observing an initial set of behaviors or factors that are a small subset of all observable behaviors of an application. In some aspects, the behavior observer module 202 may receive the initial set of behaviors and/or factors from a server and/or a component in a cloud service or network. In some aspects, the initial set of behaviors/factors may be specified in machine learning classifier models.

The behavior observer module 202 may communicate (e.g., via a memory write operation, function call, etc.) the collected observed behavior data to the feature extractor module 204. The feature extractor module 204 may be configured to receive or retrieve (e.g., from the behavior observer module, or from memory storage such as from a log file), the observed behavior data and use this information to generate one or more behavior vectors. Each behavior vector may succinctly describe the observed behavior data in a value or vector data-structure. In some aspects, the vector data structure may include a series of numbers, each of which signifies a partial or complete representation of the application behavior data collected by the behavior observer module 202.

In some aspects, the feature extractor module 204 may be configured to generate the behavior vectors so that they function as an identifier that enables the behavioral analysis system (e.g., the analyzer module 206) to quickly recognize, identify, or analyze the application behavior data. In an aspect, the feature extractor module 204 may be configured to generate behavior vectors of size "n," each of which maps the application behavior into an n-dimensional space. In an aspect, the feature extractor module 204 may be configured to generate the behavior vectors to include information that may be input to a feature/decision node in the behavior characterization module to generate an answer to a query regarding one or more features of the behavior data to characterize the behavior of the application.

The feature extractor module 204 may communicate (e.g., via a memory write operation, function call, etc.) the generated behavior vectors to the analyzer module 206. The analyzer module 206 may be configured to apply the behavior vectors to classifier modules to characterize the observed behaviors of the computing device executing the application, e.g., as within normal operating parameters, or as anomalous. In addition, the analyzer module 206 may be configured to apply the behavior vectors to classifier modules to characterize the behaviors of the computing device executing the application.

Each classifier model may be a behavior model that includes data and/or information structures (e.g., feature vectors, behavior vectors, component lists, etc.) that may be used by, e.g., by a processor of the computing device, to evaluate a specific feature or aspect of the observed behavior data. Each classifier model may also include decision criteria for monitoring a number of features, factors, data points, entries, messages, instructions, memory calls, states, conditions, behaviors, processes, operations, components, etc. (herein collectively "features") of the application. The classifier models may be preinstalled on the computing device, downloaded or received from a network server, generated in the computing device, or any combination thereof. The classifier models may be generated by using behavior modeling techniques, machine learning algorithms, or other methods of generating classifier models.

Each classifier model may be a full classifier model or a lean classifier model. A full classifier model may be a robust data model that is generated as a function of a large training dataset, which may include thousands of features and billions of entries. A lean classifier model may be a more focused data model that is generated from a reduced dataset that analyzes or tests only the features/entries that are most relevant for evaluating observed behavior data. A lean classifier model may be used to analyze a behavior vector that includes a subset of the total number of features and behaviors that could be observed in application. As an example, a processor may be may be configured to receive a full classifier model, generate a lean classifier model in the module based on the full classifier, and use the locally generated lean classifier model to evaluate application behavior data collected and represented in a behavior vector.

A locally generated lean classifier model is a lean classifier model that is generated in a behavior characterization system. A different lean classifier model may be developed by each behavior characterization system for each observed application. Further, a different combination of features may be monitored and/or analyzed in each behavior characterization system and/or computing device in order for that behavior characterization system to quickly and efficiently evaluate the behavior of the observed application. The precise combination of features that require monitoring and analysis, and the relative priority or importance of each feature or feature combination, may often only be determined using information obtained from the specific application by the specific behavior characterization system. For these and other reasons, various aspects may generate classifier models in the computing device in which the models are used.

Local classifier models may enable the device processor to accurately identify those specific features that are most important for evaluating the behavior of the observed application. The local classifier models may also allow the device processor to prioritize the features that are tested or evaluated in accordance with their relative importance to evaluating the behavior of the observed application.

In some aspects, a classifier model specific to a category or categories of an application may be used, which is a classifier model that includes a focused data model that includes/tests only observed application category-specific features/entries that are determined to be most relevant to evaluating the behavior of the application. By dynamically generating observed application-specific classifier models locally in the behavior monitoring system, the various aspects allow the computing device to focus monitoring and analysis operations on a small number of features that are most important, applicable, and/or relevant for evaluating the behavior of the observed application.

In an aspect, the analyzer module 206 may be configured to adjust the granularity or level of detail of the features of the observed application behavior that the analyzer module evaluates, such as when an analysis features of observed application behavior is inconclusive. For example, the analyzer module 206 may be configured to notify the behavior observer module 202 in response to determining that it cannot characterize a behavior of the application. In response, the behavior observer module 202 may change the factors or behaviors that are monitored and/or adjust the granularity of its observations (i.e., the level of detail, type and/or number of features, and/or the frequency at which the application's behavior is observed) based on a notification sent from the analyzer module 206 (e.g., a notification based on results of the analysis of the observed behavior features).

The behavior observer module may also observe new or additional application behaviors, and send the new/additional observed behavior data to the feature extractor module 204 and the analyzer module 206 for further analysis/classification. Such feedback communications between the behavior observer module 202 and the analyzer module 206 may enable the application behavior characterization system 220 to recursively increase the granularity of the observations (i.e., make more detailed and/or more frequent observations) or change the real-time data that are observed until the analyzer module can evaluate and characterize behavior of an observed application to within a range of reliability or up to a threshold level of reliability. Such feedback communications may also enable the behavior characterization system 220 to adjust or modify the behavior vectors and classifier models without consuming an excessive amount of the computing device's processing, memory, or energy resources. In some aspects, behavior characterization system may also reduce or restrict a number and/or type of features that are observed and analyzed based on other device conditions, such as a battery level (e.g., a battery level above or below a threshold), a network connection speed (e.g., a data rate and/or available/achievable bandwidth), a processing speed of the processor in the computing device (e.g., an available/achievable processing speed, or whether a number of processed/queued threads is above or below a threshold).

The computing device may use a full classifier model to generate a family of lean classifier models of varying levels of complexity (or "leanness"). The leanest family of lean classifier models (i.e., the lean classifier model based on the fewest number of test conditions) may be applied routinely until the analyzer module determines that it cannot reliably characterize the behavior of the application. In response to such determination, the analyzer module may provide feedback (e.g., a notification or instruction) to the behavior observer module and/or the feature extractor module to use ever more robust classifier models within the family of generated lean classifier models, until a definitive characterization of the application behavior can be made by the analyzer module. In this manner, the behavior characterization system 220 may strike a balance between efficiency and accuracy by limiting the use of the most complete, but resource-intensive classifier models to those situations where a robust classifier model is needed to definitively characterize the behavior of the observed application.

In various aspects, the computing device may be configured to generate lean classifier models by converting a representation or expression of observed behavior data included in a full classifier model into boosted decision stumps. The computing device may prune or cull the full set of boosted decision stumps based on specific features of the observed application's behavior to generate a lean classifier model that includes a subset of boosted decision stumps included in the full classifier model. The computing device may then use the lean classifier model to intelligently monitor and characterize the observed application's behavior. Boosted decision stumps are one-level decision trees that may have one node (i.e., one test question or test condition) and a weight value, and may be well suited for use in a light, non-processor intensive binary classification of data/behaviors. Applying a behavior vector to boosted decision stump may result in a binary answer (e.g., 1 or 0, yes or no, etc.). For example, a question/condition tested by a boosted decision stump may include whether an application is sending or receiving information over a communication network, or whether an application is making use of a device hardware component such as a camera, the answers to which may be binary. Boosted decision stumps are efficient because they do not require significant processing resources to generate the binary answer. Boosted decision stumps may also be highly parallelizable, and thus many stumps may be applied or tested in parallel/at the same time (e.g., by multiple cores or processors in a module, computing device, or system).

In addition, the device processor may dynamically generate application-specific classifier models that identify conditions or features that are relevant to a specific software application and/or to a specific category of software application (e.g., games, navigation, financial, news, productivity, etc.). In an aspect, such classifier models may be generated to include a reduced and more focused subset of the decision nodes that are included in the full classifier model or of those included in lean classifier model generated from the received full classifier model. In various aspects, the device processor may be configured to generate application-based classifier models for each software application in the system and/or for each category of software application in the system. In various aspects, device processor may be configured to generate the application-based classifier models dynamically, reactively, proactively, and/or every time a new application is installed or updated.

The communication device 200 may communicate with one or more network servers 220 over a communication network 224 (via, e.g., the modem processor 104 and the antenna 104a of FIG. 1). In some aspects, the behavior characterization system may download from the network servers one or more behavior models of application categories. In some aspects, the one or more behavior models may be organized in a category tree, or another similar organizational structure. The behavior characterization system may collect and store network traffic-related data from one or more applications, and may further associate the network traffic-related data with one or more application categories. The behavior characterization system may also collect state-related data of the computing device in addition to the network traffic-related data, and may send the state-related data to the network servers 220.

The servers 220 may use the network traffic-related data and the state-related data to generate advanced traffic models for one or more categories of applications. For example, the servers 220 may generate a customized model for each category and device state, to train one or more advanced traffic models to detect anomalous network activity of an application. Thus, the computing device together with the servers may observe and categorize new applications, as well as develop advanced traffic models to more efficiently identify anomalous activity of applications. In some aspects, the servers 220 may provide the one or more advanced traffic models to the computing device for testing, gathering of additional information, and further refinement of the traffic models. The servers 220 may provide the advanced traffic models to other computing devices 222, and further the servers 220 may provide application category models to the other computing devices 222 and receive network traffic-related data and state-related data from the other computing devices 222. By so doing, the computing device 200, the servers 220, and the other computing devices 222 may collectively gather application behavior and device state data and generate advanced traffic models using a very large data set, to generate highly efficient advanced traffic models to detect anomalous application behavior.

Figure 3:
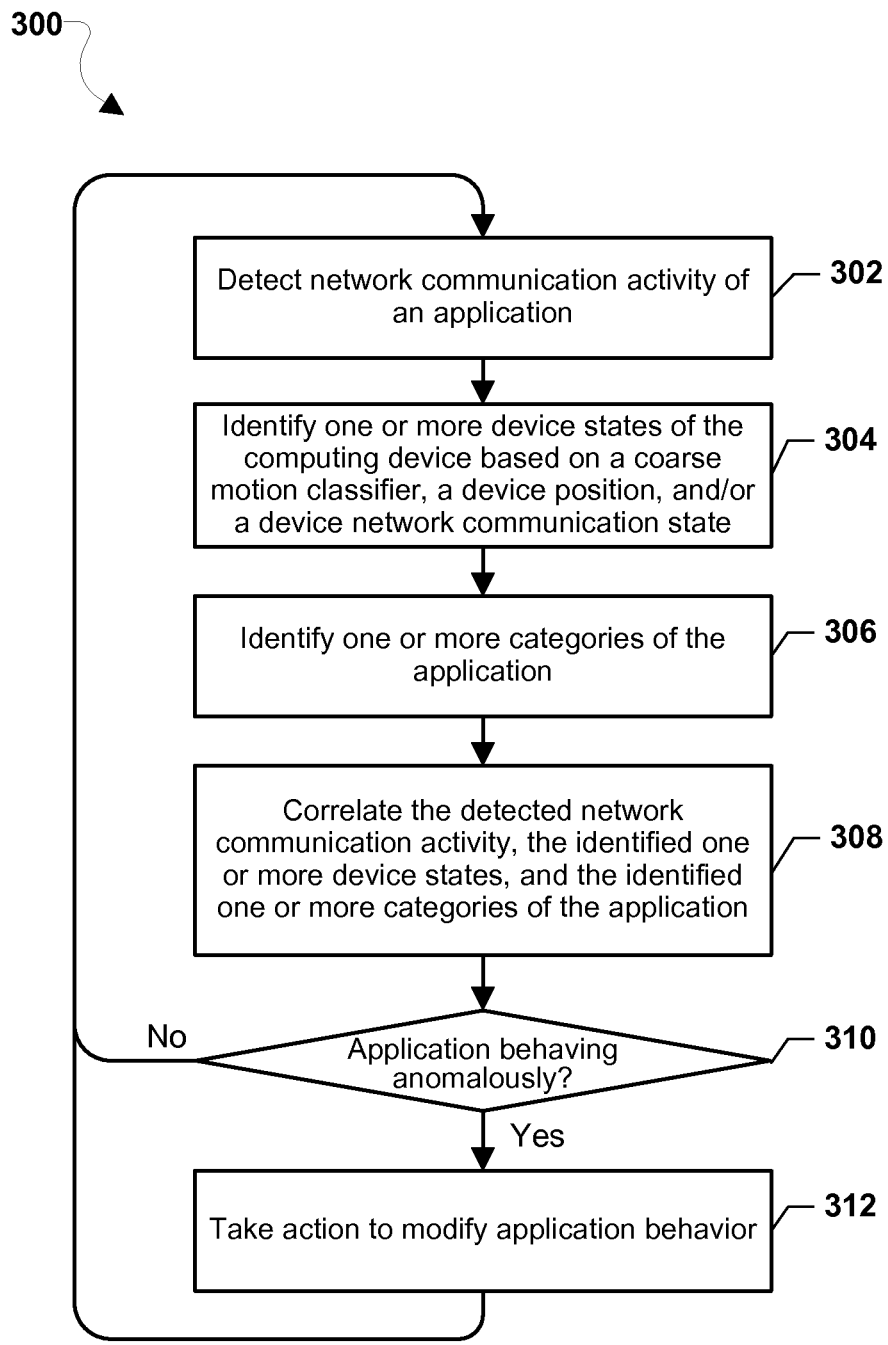
FIG. 3 is a process flow diagram illustrating a method for identifying anomalous application behavior in accordance with the various aspects.

FIG. 3 illustrates a method 300 for identifying anomalous application behavior in accordance with the various aspects. The method 300 may be performed by a processing core or device processor, such as a processor on a system-on-chip (e.g., processors 102, 104, 106, and 108 on the SOC 100 illustrated in FIG. 1) or any similar device processor, and may employ a behavioral analysis system to observe and characterize behaviors of an observed module (e.g., the behavior characterization system 220 in FIG. 2).

With reference to FIGS. 1-3, in block 302, the processor may detect network communication activity of an application on a computing device. The network communication activity may include one or more of a network traffic pattern of the network communication activity, a quantity of information sent by the application, a quantity of information received by the application, a quantity of destinations to which information is sent by the application, a quantity of sources from which information is received by the application, a type of information sent or received by the application, a data protocol used by the application, and a port traffic mapping related to the network communication activity of the application.

In block 304, the processor may identify one or more device states of the computing device based on a coarse motion classifier, device position, and/or a device network communication state. The processor may determine the coarse motion classifier based on a detected motion state of the device, such as standing, walking, running, biking, and other motion states. The processor may determine the coarse motion classifier using, for example, GPS data received by the computing device, accelerometer data, and other motion data that may be computed or received by the computing device. The processor may determine the device position tracking classifier based on whether the device is in use (i.e., is experiencing motion, detecting ambient light levels, detecting RF signal strength levels, and other information inputs consistent with being in a user's hand, or being worn on the user's body) or not in use (i.e., is in a device holster, in a bag, on a tabletop, or another position consistent with not being in use). The processor may determine the network communication state based on whether the communication device is connected to a communication network (e.g., a Wi-Fi network, a cellular network, or both, or neither). The processor may also determine the network communications state based on a volume of data traffic sent or received by the computing device in communication with one or more communication networks.

In block 306, the processor may identify one or more categories the application. A category may describe a general classification of an application, for example, messaging, voice, navigation, education, social, photo gallery, camera, browser, e-book reader, music player, media player, weather, note taking, calculator, application store, as well as other possible general classifications. In some aspects, the processor may use the behavior characterization system to identify one or more categories of the application.

In block 308, the processor may correlate the detected network communication activity, the identified one or more device states, and the identified one or more categories of the application. In determination block 310, the processor may determine whether the application is behaving anomalously. In response to determining that the application is not behaving anomalously (i.e., determination block 310="No"), the processor may return to block 302 and may repeat the operations of blocks 302-310).

In response to determining that the application is behaving anomalously (i.e., determination block 310="Yes"), the processor may take an action to modify the application behavior in block 312. In some aspects, the processor may take action to limit or stop any network communication activity of the application.

Figure 4:
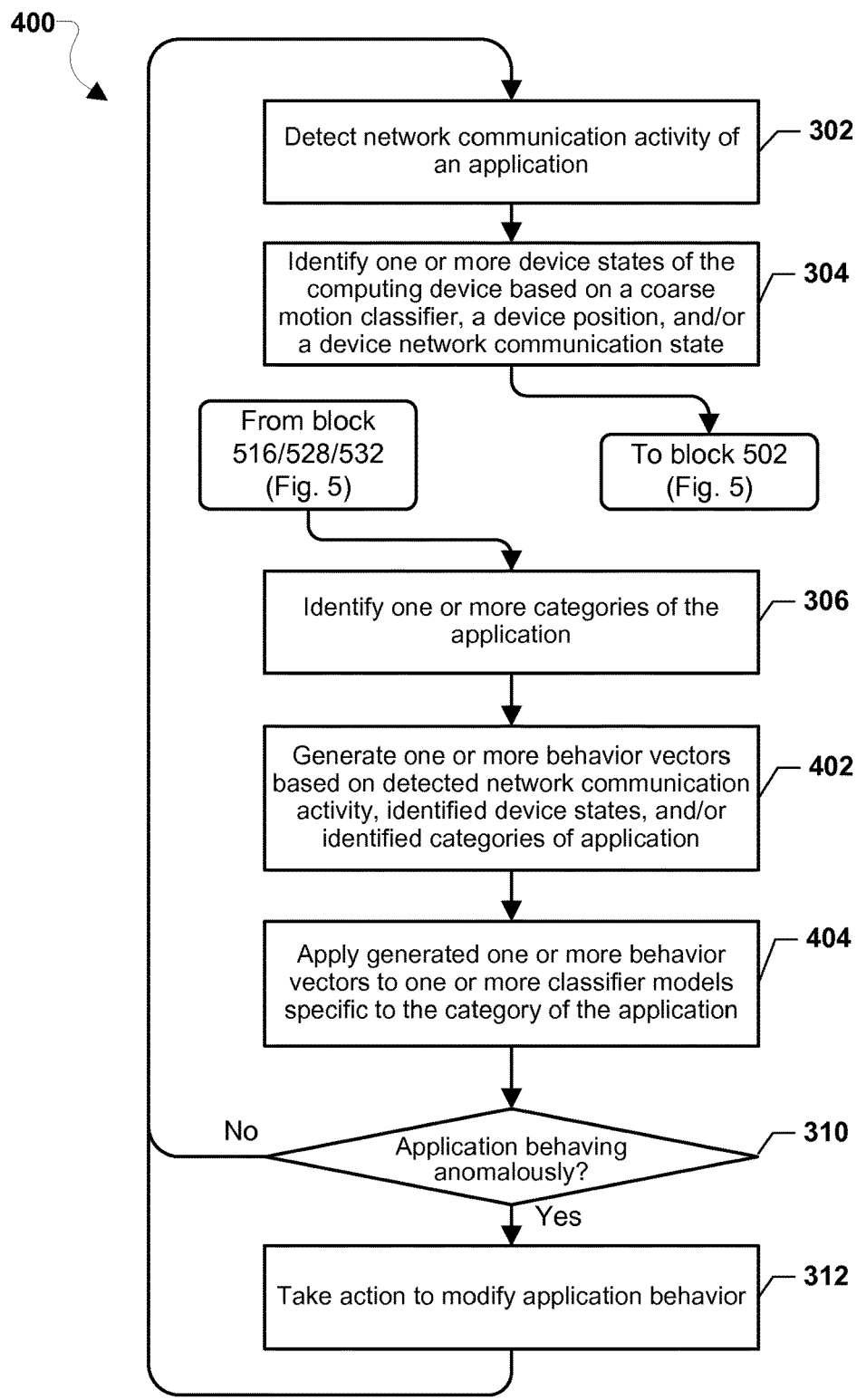
FIG. 4 is another process flow diagram illustrating a method for identifying anomalous application behavior in accordance with the various aspects.

FIG. 4 illustrates a method 400 for identifying anomalous application behavior in accordance with the various aspects. The method 400 may be performed by a processing core or device processor of a module, such as a processor on a system-on-chip (e.g., processors 102, 104, 106, and 108 on the SOC 100 illustrated in FIG. 1) (e.g., processors 102, 104, 106, and 108 on the SOC 100 illustrated in FIG. 1) or any similar device processor, and may employ a behavioral analysis system to observe and characterize behaviors of an observed module (e.g., the behavior characterization system 220 in FIG. 2). In some aspects the device processor may perform operations in blocks 302-312 similar to those described with reference to blocks 302-312 of the method 300 (see FIG. 3).

In block 304, the processor may identify one or more device states of the computing device based on a coarse motion classifier, device position, and/or a device network communication state. The processor may then proceed to block 502, illustrated in FIG. 5, which is further described below. The processor may return from block 516, 528, or 532, illustrated in FIG. 5, and in block 306, the processor may identify one or more categories the application.

In block 402, the processor may generate one or more behavior vectors based on detected network communication activity of an application, identify device states, and/or identified categories of the application. For example, a feature extractor module (e.g., the feature extractor module 204 of FIG. 2) may generate one or more behavior vectors using the network communication activity of the application, the identify device states, and/or the identified categories of the application. In some aspects, the feature extractor module may obtain observed application behaviors and/or device state information directly from a behavior observer module (e.g., the behavior observer module 202 of FIG. 2) or from a memory location or data structure (e.g., a buffer, a log file, or another similar storage location).

In block 404, the processor may apply the generated one or more behavior vectors to one or more classifier models that is specific to or generated for the application category determined in block 306. For example, if the application category determined in block 306 is a text or word processor, the analyzer module (e.g., the analyzer module 206 of FIG. 2) may apply the generated one or more behavior vectors to one or more text or word processor classifier models (versus game, browser, or social media classifier models). The analyzer module may be configured to apply the behavior vectors to classifier modules to characterize behaviors of the observed application, e.g., as within normal operating parameters, or as anomalous.

Based on the comparison of the generated one or more behavior vectors with the one or more classifier models, in determination block 310, the processor may determine whether the application is behaving anomalously. In response to determining that the application is not behaving anomalously (i.e., determination block 310="No"), the processor may return to block 302 and may repeat the operations of blocks 302-310). In response to determining that the application is behaving anomalously (i.e., determination block 310="Yes"), the processor may take an action to modify the application behavior in block 312. In some aspects, the processor may take action to limit or stop any network communication activity of the application.

Figure 5:
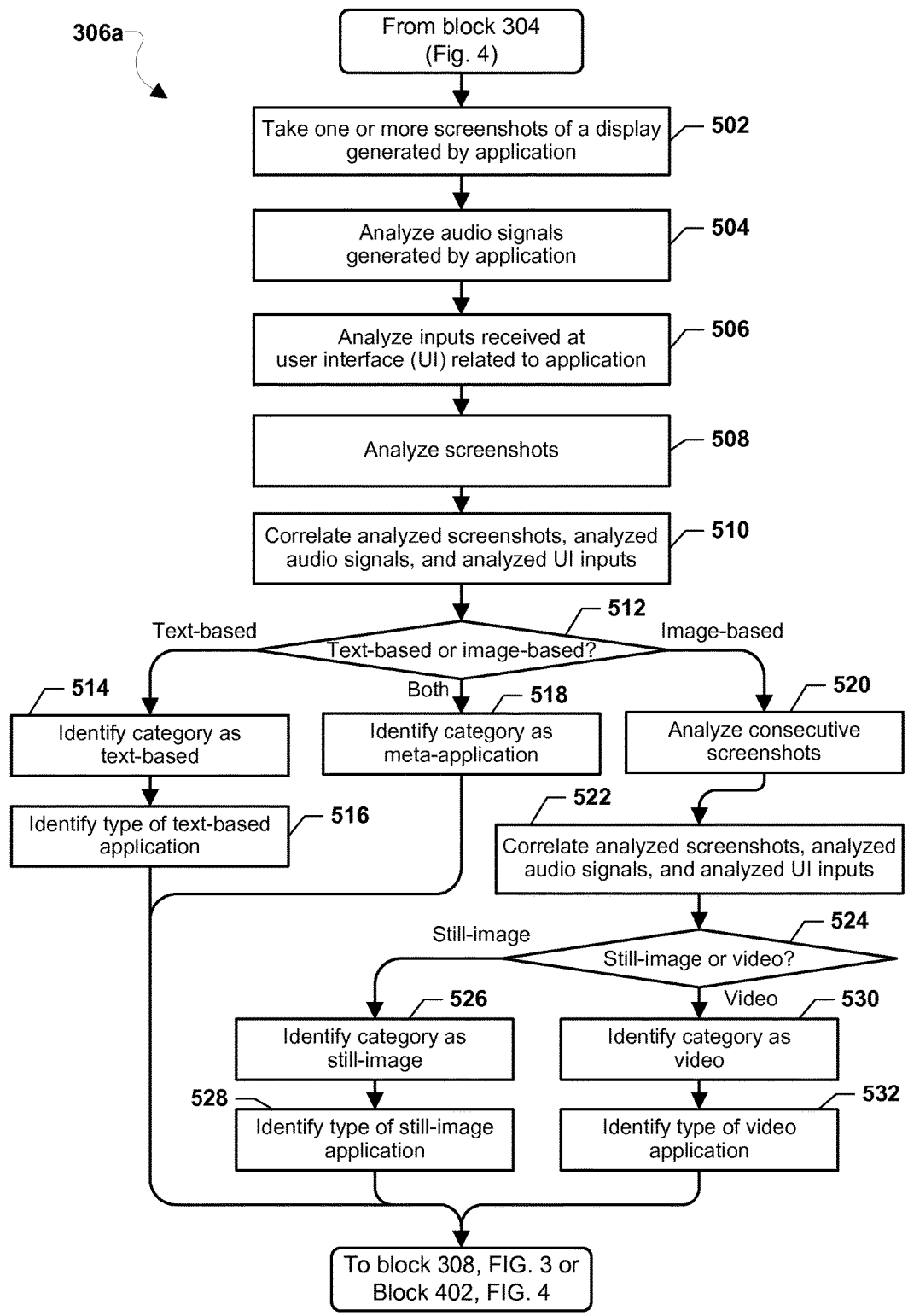
FIG. 5 is another process flow diagram illustrating a method of identifying a category of an application for identifying anomalous application behavior in accordance with the various aspects.

FIG. 5 illustrates a method 306a for categorizing an application based on observable aspects in block 306 of the method 300 or the method 400 according to an aspect. The method 306a may be performed by a processing core or device processor, such as a processor on a system-on-chip (e.g., processors 102, 104, 106, and 108 on the SOC 100 illustrated in FIG. 1) or any similar device processor, and may employ a behavioral analysis system to observe and characterize behaviors of an observed module (e.g., the behavior characterization system 220 in FIG. 2).

The method 306a may be performed after block 304 of the method 300 or the method 400 as described above. In block 502, the processor may obtain one or more screenshots of the display generated by an application running on a computing device. The one or more screenshots may be taken in close sequence, or may be separated in sequence by a period of time. The processor may take the one or more screenshots to capture display activity generated by the running application.

In block 504, the processor may analyze audio signals generated by the application. The processor may use the audio signals of the application as additional data to more accurately categorize the application. For example, a gaming application, video streaming application, or media player application may generate audio signal recognizable as music, whereas an electronic book reader or a messaging application may generate audio signals as feedback that are relatively infrequent, and distinguishable from music. As another example, a gaming application may use higher pitched sounds compared to video of a streaming video or media player application. Further, a gaming application may use highly repetitive or periodic sounds, which may be distinguishable from audio signals the streaming video or media player application.

In block 506, the processor may analyze inputs that are related to the application and that are received at a user interface. The processor may use the user interface inputs related to the application as additional data to more accurately categorize the application. For example, the streaming video or media player application may have little if any user interface interaction. As another example, a photo gallery application for web browser application may receive user interface inputs in a relatively specific and recognizable pattern, such as scrolling up and down, scrolling side to side, typing on a keyboard area, and other similar user interface inputs. As another example, a gaming application may be expected to involve a much greater frequency and diversity of user interface inputs.

In block 508, the processor may analyze the one or more screenshots. In some aspects, the processor may use a variety of image analysis techniques to analyze the one or more screenshots, and may also analyze changes in a sequence of screenshots. In some aspects, the processor may determine whether the one or more screenshots are predominantly text or predominantly images. For example, the processor may use a "corner counting" technique by analyzing detectable sharp corners in the one or more screenshots, which may be more prevalent in text than in an image. In some aspects, a corner may be defined as an intersection of two edges, or a corner may be defined as a point for which there are two dominant in different edge directions in a local neighborhood of the point. As examples, an electronic book reader application, a browser application displaying a newspaper article, and a messaging application, may display large chunks of primarily text, which may include a much higher average number of corners as compared to an image. Conversely, a browser application displaying photographs, a photo gallery application, or video application, as examples, may include a much lower average number of corners.

The processor may also plot a histogram of gray values or gradient norms, which may be more diverse for images, and more binary (e.g., more strictly black-and-white) for text. As examples, in an electronic book reader application, a browser application displaying a newspaper article, or a messaging application, the histogram may be concentrated on two bins, a background color and a foreground color (e.g., white background and dark text). In contrast, in a browser application displaying photographs, a photo gallery application, or a video application, the histogram may be smoother reflecting a higher number of active bins due to greater variation in color across an image.

In some aspects, the processor may further distinguish between screenshots taken from video and screenshots of still images. For example, the processor may use gradient distributions to distinguish relatively lower contrasting videos as compared to still images (i.e., a sequence of still images, such as from a photo gallery application, may exhibit much greater variation than a sequence of screenshots from a video). The processor may also compute a percentage of overlap or changes among a sequence of screenshots, which may be relatively high in a sequence of screenshots from a video (e.g., from a media player application or video streaming application), and which may be relatively low in a sequence of screenshots that are very different (e.g., from a photo gallery application, series of images in a browser, or from a similar application). The processor may also compute an XOR function to identify higher overlap (i.e., lower XOR) in a sequence of screenshots from a video, as opposed to a sequence of screenshots from different images. The processor may also determine a number of matching descriptors of each of the one or more screenshots, which may be higher in a sequence of screenshots from a video, as opposed to a sequence of screenshots from different images.

In some aspects, the processor may identify one or more categories for the application with a relatively high level of granularity. For example, the processor may identify an application as a gaming application, and further, the processor may distinguish the gaming application as an action game (e.g., exhibiting relatively high motion from screenshot to screenshot), a board game e.g., exhibiting relatively low motion or static motion from screenshot to screenshot), and so forth, using one or more processes to distinguish between screenshots from various types of gaming applications.

In some aspects, the processor may also identify certain applications as a meta-application, which is an application that exhibits behaviors that may be associated with text-based applications and image-based applications, such as a web browser. For example, the processor may determine that one or more screenshots exhibit characteristics identifiable with text-based applications, and other characteristics identifiable with image-based applications, and based on such determination may identify an application as a meta-application.

In block 510, the processor may correlate the analyze screenshots, the analyzed audio signals, and the analyzed user interface. The processor may correlate the analyzed audio signals and or analyzed inputs to more accurately determine the category or categories of the application.

In determination block 512, the processor may determine whether the application is a text-based application or an image-based application, or some combination of the two. In response to determining that the application is a text-based application (i.e., determination block 512="Text-based"), the processor may identify a category of the application as text-based in block 514. In block 516, the processor may identify a type of text-based application. For example, the processor may use one or more image analysis processes (e.g., one or more of the image analysis techniques described above) to determine whether an application is a messaging application, an electronic book reader, an educational application, and/or another text-based application. The processor may then proceed to block 306 of the method 300 or block 402 of the method 400 as described above.

In response to determining that the application is an image-based application (i.e., determination block 512="Image-based"), the processor may analyze consecutive screenshots in block 522 further distinguish the application between a still-image application and a video application. For example, the processor may use one or more image analysis processes (e.g., such as one or more of the techniques described above) to determine whether the one or more screenshots exhibit characteristics more consistent with a series of still images or with a sequence of images from a video.

In determination block 524, the processor may determine whether the application is a still-image application or a video application. In response to determining that the application is a still-image application (i.e., determination block 524="Still-image"), the processor may identify a category of the application as still-image in block 526. In block 528, the processor may identify a type of still-image application. For example, the processor may use one or more image analysis processes (e.g., one or more of the image analysis techniques described above) to determine whether an application is a photo gallery application, a board game, a photo processing application, a paint application, and/or another still-image application. The processor may then proceed to block 306 of the method 300 or block 402 of the method 400 as described above.

In response to determining that the application is a video application (i.e., determination block 524="Video"), the processor may identify a category of the application as video in block 530. In block 320, the processor may identify a type of video application. For example, the processor may use one or more image analysis processes (e.g., one or more of the image analysis techniques described above) to determine whether an application is a streaming media application, a video application, an action game, a video editing application, and/or another video application. The processor may then proceed to block 306 of the method 300 or block 402 of the method 400 as described above.

Figure 6:
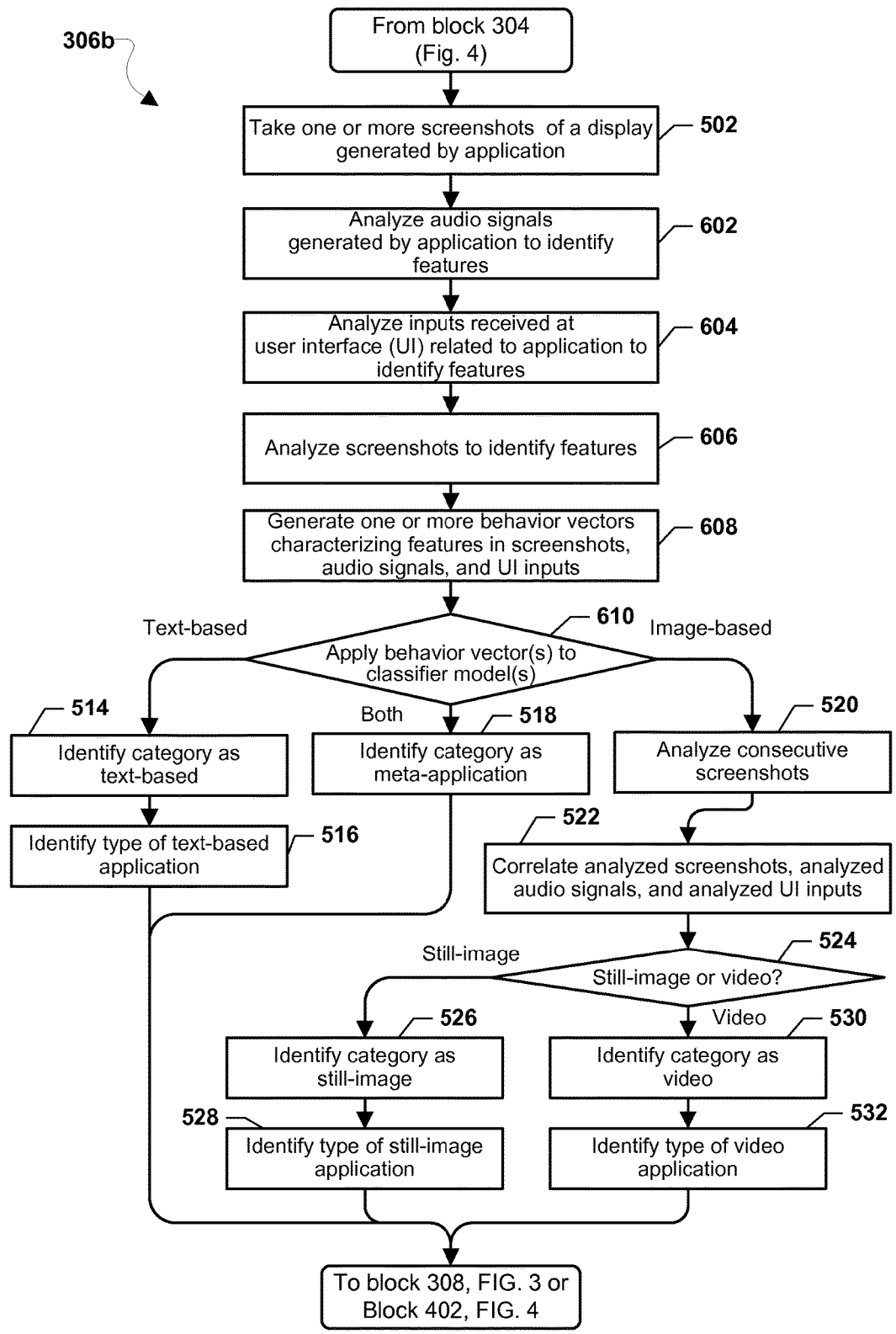
FIG. 6 is another process flow diagram illustrating a method of identifying a category of an application for identifying anomalous application behavior in accordance with the various aspects.

FIG. 6 illustrates a method 306b for categorizing an application based on observable aspects in block 306 of the method 300 or the method 400 using a feature vector and a classifier model according to an aspect. The method 306B may be performed by a processing core or device processor, such as a processor on a system-on-chip (e.g., processors 102, 104, 106, and 108 on the SOC 100 illustrated in FIG. 1) or any similar device processor, and may employ a behavioral analysis system to observe and characterize behaviors of an observed module (e.g., the behavior characterization system 220 in FIG. 2).

The method 306b may be performed after block 304 of the method 300 or the method 400 as described above. In block 502, the processor may obtain one or more screenshots of the display generated by an application running on a computing device as described above with reference to FIG. 5. In block 602, the processor may analyze audio signals generated by the application to identify one or more features of the audio signals. In block 604, the processor may analyze inputs received a user interface related to the application to identify one or more features of the user interface inputs. In block 606, the processor may analyze the one or more screenshots using one or more image analysis techniques to identify one or more features of the screenshots. For example, a behavior observer module (e.g., the behavior observer module 202 of FIG. 2) may receive and/or analyze one or more screenshots taken of a display generated by the application, audio signals generated by the application, and or user interface inputs related to the application, and may provide the received information about the application to a feature extractor module (e.g., the feature extractor module 204 of FIG. 2).

In block 608, the processor may generate one or more behavior vectors characterizing features extracted from the one or more screenshots, the audio signals, and/or the user interface inputs of the application. For example, the feature extractor module may generate one or more behavior vectors using features of the analyzed one or more screenshots, the audio signals, and/or the user interface inputs. In some aspects, the feature extractor module may obtain information about the one or more screenshots, the audio signals and/or the user interface inputs directly from the behavior observer module, or from a memory location or data structure (e.g., a buffer, a log file, or another similar storage location).

In block 610, the processor may apply the one or more behavior vectors to the one or more classifier models. For example, an analyzer module (e.g., the analyzer module 206 of FIG. 2) may apply the generated one or more behavior vectors to one or more classifier models. The analyzer module may be configured to apply the behavior vectors to classifier modules to characterize or identify a category of the application as text-based, image-based, or as a meta-application.

Having identified a category of the application as text-based, image-based, or as a meta-application, for example, the processor may perform operations of blocks 514-532 as described for like numbered blocks in the method 500 with reference to FIG. 5. The processor may then proceed to block 306 of the method 300 or block 402 of the method 400 as described above.

The various aspects improve upon existing solutions by using behavior analysis and/or machine learning techniques to monitor and evaluate the behavior of an application running on a computing device to determine whether the observed application is behaving anomalously, and in particular to determine whether the network medication activity of the observed application is consistent with one or more identified categories of the application. The use of behavior analysis or machine learning techniques by the computing device to evaluate the behavior of an observed application is important because current computing devices and electronic systems are extremely complex systems, and different combinations of observable behaviors/features/factors of each application may require a different analysis in each device or system in order for that device to evaluate the behavior of an application. The precise combination of behaviors and/or features that an observer module may monitor may, in some cases, be determined using information obtained from the specific observed module. For these and other reasons, existing solutions are not adequate for evaluating observed modules for anomalous behavior in a highly complex and diverse system or device, and without consuming a significant amount of the system's or device's processing, memory, and/or power resources.

Figure 7:
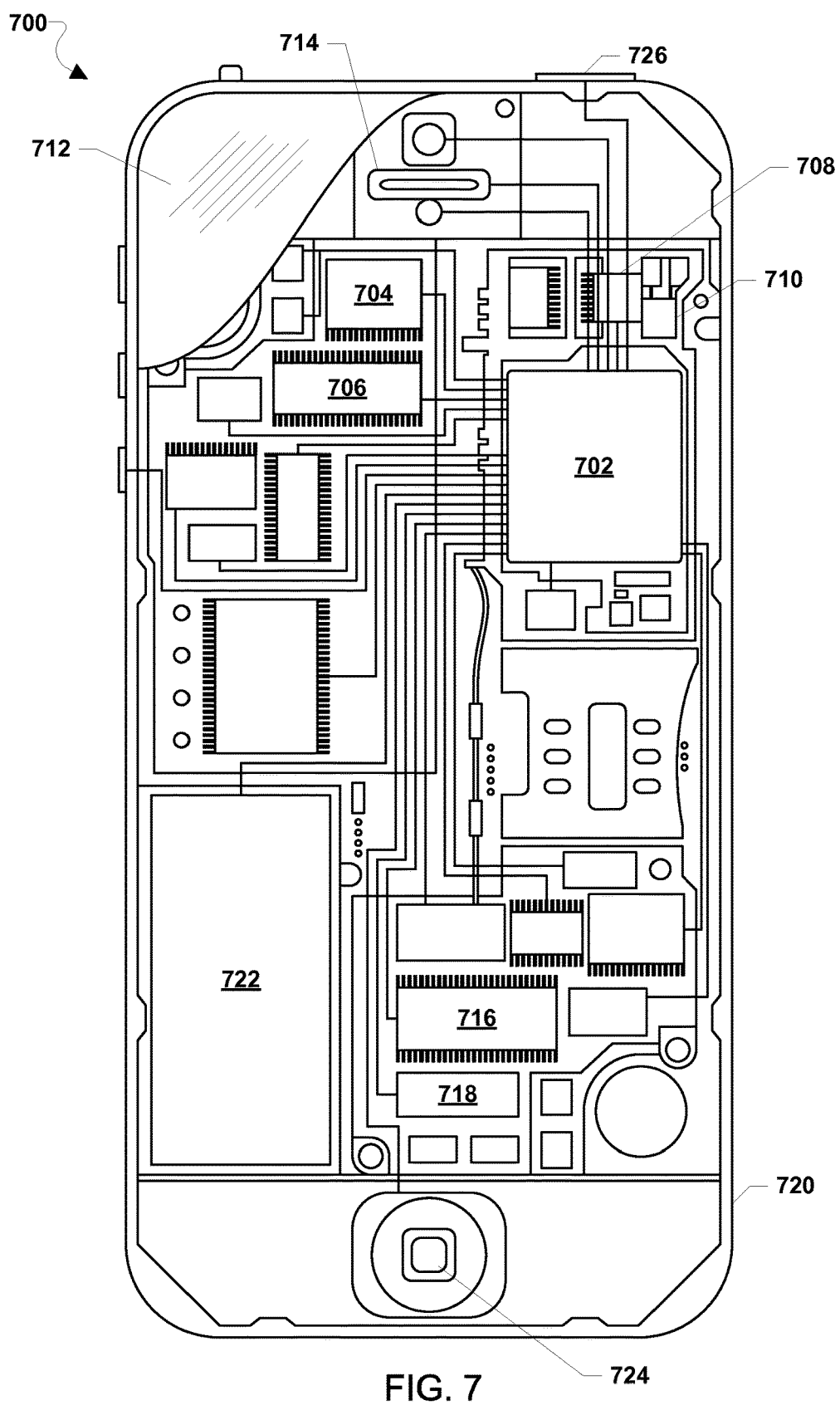
FIG. 7 is a component block diagram of a mobile device suitable for use with various aspects.

The various aspects, including the aspects discussed above with reference to FIGS. 1-6, may be implemented on a variety of computing devices, an example of which is the mobile communication device 700 illustrated in FIG. 7. The mobile computing device 700 may include a processor 702 coupled to internal memory 704, a display 712, and to a speaker 714. The processor 702 may be one or more multi-core integrated circuits designated for general or specific processing tasks. The internal memory 704 may be volatile or non-volatile memory, and may also be secure and/or encrypted memory, or unsecure and/or unencrypted memory, or any combination thereof. The mobile communication device 700 may have two or more radio signal transceivers 708 (e.g., Peanut, Bluetooth, Zigbee, Wi-Fi, RF radio, etc.) and antennae 710 for sending and receiving communications, coupled to each other and to the processor 702. Additionally, the mobile communication device 700 may include an antenna 710 for sending and receiving electromagnetic radiation that may be connected to a wireless data link and/or transceiver 708 coupled to the processor 702. The mobile communication device 700 may include one or more cellular network wireless modem chip(s) 716 coupled to the processor 702 and antennae 710 that enable communications via two or more cellular networks via two or more radio access technologies.

The mobile communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown). The mobile communication device 700 may also include speakers 714 for providing audio outputs. The mobile communication device 700 may also include a housing 720, constructed of a plastic, metal, or a combination of materials, for containing all or some of the components discussed herein. The mobile communication device 700 may include a power source 722 coupled to the processor 702, such as a disposable or rechargeable battery. The rechargeable battery may also be coupled to the peripheral device connection port to receive a charging current from a source external to the mobile communication device 700. The mobile communication device 700 may also include a physical button 724 for receiving user inputs. The mobile communication device 700 may also include a power button 726 for turning the mobile communication device 700 on and off.

The processor 702 may be any programmable microprocessor, microcomputer or multiple processor chip or chips that can be configured by software instructions (applications) to perform a variety of functions, including the functions of various aspects described below. In some mobile communication devices, multiple processors 702 may be provided, such as one processor dedicated to wireless communication functions and one processor dedicated to running other applications. Typically, software applications may be stored in the internal memory 704 before they are accessed and loaded into the processor 702. The processor 702 may include internal memory sufficient to store the application software instructions. In various aspects, the processor 712 may be a device processor, processing core, or an SOC (such as the example SOC 100 illustrated in FIG. 1). In an aspect, the mobile communication device 700 may include an SOC, and the processor 702 may be one of the processors included in the SOC (such as one of the processors 102, 104, 106, 108, and 110 illustrated in FIG. 1).

Computer code or program code for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various aspects.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the various aspects. Various modifications to these aspects will be readily apparent to those skilled in the art, and the generic principles defined herein may be applied to other aspects without departing from the spirit or scope of the various aspects. Thus, the various aspects are not intended to be limited to the aspects shown herein but is to be accorded the widest scope consistent with the following claims and the principles and novel features disclosed herein.

What is claimed is:

1. A method of identifying anomalous application behavior of a computing device, comprising:
   detecting, by a processor of the computing device, network communication activity of an application on the computing device;
   identifying, by the processor, one or more device states of the computing device;
   identifying, by the processor, one or more categories of the application by:
      analyzing one or more screenshots of a display generated by the application on the computing device; and
      analyzing inputs received at a user interface of the computing device related to the application; and
      correlating the analyzed inputs at the user interface with the one or more screenshots of the display generated by the application on the computing device;
   determining, by the processor, whether the application is behaving anomalously based on a correlation of the detected network communication activity of the application, the identified one or more device states of the computing device, and the identified one or more categories of the application; and
   taking, by the processor, an action to modify the application behavior if it is determined that the application is behaving anomalously.

2. The method of claim 1, wherein the network communication activity comprises one or more of a network traffic pattern of the network communication activity, a quantity of information sent by the application, a quantity of information received by the application, a quantity of destinations to which information is sent by the application, a quantity of sources from which information is received by the application, a type of information sent or received by the application, a data protocol used by the application, and a port traffic mapping related to the network communication activity of the application.

3. The method of claim 1, wherein the one or more device states comprise one or more of a coarse motion classifier, a device position, and a device network communication state.

4. The method of claim 1, wherein determining whether the application is behaving anomalously based on the correlation of the detected network communication activity of the application, the identified one or more device states of the computing device, and the identified one or more categories of the application comprises:
   generating a behavior vector based on the detected network communication activity of the application, the identified one or more device states of the computing device, and the identified one or more categories of the application;
   applying one or more classifier models appropriate for the one or more categories of the application to the generated behavior vector; and
   determining whether the application is behaving anomalously based on a result of applying one or more classifier models appropriate for the one or more categories of the application to the generated behavior vector.

5. The method of claim 1, further comprising taking an action to limit an application behavior in response to determining that the application is behaving anomalously.

6. The method of claim 1, wherein analyzing one or more screenshots of the display generated by the application on the computing device comprises determining whether the application is an image-based application, a text-based application, or a meta-application based on a plurality of screenshots of the display generated by the application on the computing device.

7. The method of claim 6, wherein analyzing one or more screenshots of the display generated by the application on the computing device comprises determining whether the application is a still-image application or a video application in response to determining that the application is an image-based application.

8. The method of claim 1, wherein identifying one or more categories of the application comprises:
   analyzing audio signals generated by the application; and
   correlating the analyzed audio signals with the one or more screenshots of the display generated by the application on the computing device.

9. A method of determining a category of an application on a computing device, comprising:
   obtaining, by a processor of the computing device, one or more screenshots of a display generated by the application on the computing device;
   generating, by the processor, a feature vector characterizing the obtained one or more screenshots of the display generated by the application on the computing device, wherein generating the feature vector comprises:
      analyzing inputs received at a user interface of the computing device related to the application; and
      correlating the analyzed inputs at the user interface with the one or more screenshots of the display generated by the application on the computing device;
   determining, by the processor, whether the application is behaving anomalously by applying, by the processor, a classifier model to the feature vector, wherein one or more categories of the application are identified based on results of applying the classifier model to the feature vector; and taking, by the processor, an action to modify the application behavior if it is determined that the application is behaving anomalously.

10. The method of claim 9, wherein applying the classifier model to the feature vector, wherein one or more categories of the application are identified based on results of applying the classifier model to the feature vector comprises determining whether the application is an image-based application, a text-based application, or a meta-application based on the generated feature vector.

11. The method of claim 10, wherein applying the classifier model to the feature vector, wherein one or more categories of the application are identified based on results of applying the classifier model to the feature vector comprises determining whether the application is a still-image application or a video application in response to determining that the application is an image-based application.

12. The method of claim 9, wherein generating a feature vector comprises:

analyzing audio signals generated by the application; and
correlating the analyzed audio signals with the one or more screenshots of the display generated by the application on the computing device.

13. A computing device, comprising:
an antenna; and
a processor coupled to the antenna and configured with processor-executable instructions to:
  detect network communication activity, communicated via the antenna, of an application on the computing device;
  identify one or more device states of the computing device;
  identify one or more categories of the application by:
    analyzing one or more screenshots of a display generated by the application on the computing device;
    analyzing inputs received at a user interface of the computing device related to the application; and
    correlating the analyzed inputs at the user interface with the one or more screenshots of the display generated by the application on the computing device;
  determine whether the application is behaving anomalously based on a correlation of the detected network communication activity of the application, the identified one or
    more device states of the computing device, and the identified one or more categories of the application; and
  take an action to modify the application behavior if it is determined that the application is behaving anomalously.

14. The computing device of claim 13, wherein the network communication activity comprises one or more of a network traffic pattern of the network communication activity, a quantity of information sent by the application, a quantity of information received by the application, a quantity of destinations to which information is sent by the application, a quantity of sources from which information is received by the application, a type of information sent or received by the application, a data protocol used by the application, or a port traffic mapping related to the network communication activity of the application.

15. The computing device of claim 13, wherein the one or more device states comprise one or more of a coarse motion classifier, a device position, and a device network communication state.

16. The computing device of claim 13, wherein the processor is further configured with processor-executable instructions to determine whether the application is behaving anomalously based on the correlation of the detected network communication activity of the application, the identified one or more device states of the computing device, and the identified one or more categories of the application by:

generating a behavior vector based on the detected network communication activity of the application, the identified one or more device states of the computing device, and the identified one or more categories of the application;
applying one or more classifier models appropriate for the one or more categories of the application to the generated behavior vector; and
determining whether the application is behaving anomalously based on a result of applying one or more classifier models appropriate for the one or more categories of the application to the generated behavior vector.

17. The computing device of claim 13, wherein the processor is further configured with processor-executable instructions to take an action to limit an application behavior in response to determining that the application is behaving anomalously.

18. The computing device of claim 13, wherein the processor is further configured with processor-executable instructions to analyze one or more screenshots of the display generated by the application on the computing device by determining whether the application is an image-based application, a text-based application, or a meta-application based on a plurality of screenshots of the display generated by the application on the computing device.

19. The computing device of claim 13, wherein the processor is further configured with processor-executable instructions to analyze one or more screenshots of the display generated by the application on the computing device by determining whether the application is a still-image application or a video application in response to determining that the application is an image-based application.

20. The computing device of claim 13, wherein the processor is configured with processor-executable instructions to identify one or more categories of the application by:

analyzing audio signals generated by the application; and
correlating the analyzed audio signals with the one or more screenshots of the display generated by the application on the computing device.

21. A computing device, comprising:
a display; and
a processor coupled to the display and configured with processor-executable instructions to:
  obtain one or more screenshots of the display generated by an application on the computing device;
  generate a feature vector characterizing the obtained one or more screenshots of the display generated by the application on the computing device, wherein generating the feature vector by:
    analyzing inputs received at a user interface of the computing device related to the application; and correlating the analyzed inputs at the user interface with the one or more screenshots of the display generated by the application on the computing device;

determine whether the application is behaving anomalously by applying a classifier model to the feature vector, wherein one or more categories of the application are identified based on results of applying the classifier model to the feature vector; and take an action to modify the application behavior if it is determined that the application is behaving anomalously.

22. The computing device of claim 21, wherein the processor is further configured with processor-executable instructions to apply the classifier model to the feature vector by determining whether the application is an image-based application, a text-based application, or a meta-application based on the generated feature vector.

23. The computing device of claim 22, wherein the processor is further configured with processor-executable instructions to apply the classifier model to the feature vector by determining whether the application is a still-image application or a video application in response to determining that the application is an image-based application.

24. The computing device of claim 21, wherein the processor is further configured with processor-executable instructions to generate a feature vector by:

analyzing audio signals generated by the application; and correlating the analyzed audio signals with the one or more screenshots of the display generated by the application on the computing device.

* * * * *